United States Patent [19]
Demirörs et al.

[11] Patent Number: 6,093,781
[45] Date of Patent: *Jul. 25, 2000

[54] NON-LINEAR STYRENIC POLYMER COMPOSITIONS AND ARTICLES PREPARED THEREFROM

[75] Inventors: Mehmet Demirörs, Terneuzen, Netherlands; Jozef Julius Sleeckx, Sint-Martens-Latem; Peter Hendrikus Vollenberg, Gent, both of Belgium; Chau V. Vo, Souffelweyersheim, France; Gary C. Welsh, Midland, Mich.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/817,077

[22] Filed: Apr. 9, 1997

[30] Foreign Application Priority Data

Oct. 13, 1994 [GB] United Kingdom .................. 9420645

[51] Int. Cl.$^7$ .......................... C08F 212/04; C08L 25/00
[52] U.S. Cl. ............................. 526/347; 526/65; 526/73; 526/324; 526/329.2; 526/346; 525/53; 525/232; 525/241; 525/316; 528/501; 521/146
[58] Field of Search ................................. 526/346, 65, 73, 526/329.2, 347, 324; 525/232, 241, 53, 316; 521/146; 264/544, 331.17, 331.18; 528/501

[56] References Cited

U.S. PATENT DOCUMENTS

| 2,638,466 | 5/1953 | Amos et al. .............................. 528/501 |
| 4,386,125 | 5/1983 | Shiraki et al. ............................. 428/36 |
| 4,980,381 | 12/1990 | Hintz et al. ............................... 521/56 |
| 5,110,836 | 5/1992 | Harclerode et al. ....................... 521/58 |
| 5,112,875 | 5/1992 | Zimmermann et al. .................. 521/60 |
| 5,114,640 | 5/1992 | Harclerode et al. ....................... 264/53 |
| 5,115,066 | 5/1992 | Zimmermann et al. ................. 526/346 |
| 5,459,210 | 10/1995 | Kihara et al. ....................... 526/336 X |

FOREIGN PATENT DOCUMENTS

| 208382 | 1/1987 | European Pat. Off. . |
| 441485 | 8/1991 | European Pat. Off. . |
| 2352838 | 12/1977 | France . |
| 61-88713 | 5/1986 | Japan . |
| 62-197407 | 9/1987 | Japan . |
| 2074591 | 11/1981 | United Kingdom . |
| 2232160 | 12/1990 | United Kingdom . |

OTHER PUBLICATIONS

"Influence of Long Chain Branching on the Elongational Behavior of Different Polyethylenes and Their Blends", Polymer Bulletin 15, 381–387 (1986).

"On the effects of very low levels of long Chain Branching on Rheological Behavior in Polyethylene"; Journal of Applied Polymer Science, vol. 30, 3751–3765 (1985); John Wiley & Sons, Inc.

"Analysis of Long Chain Branching in High Density Polyethylene"; by J.K. Hughes; Phillips Petroleum Company/Oklahoma; pp. 306–309.

"On the Contribution of Long Chain Branching to Poyethylene Melt Rheology", by W.M. Whitte, J.C. Randall and C. H. Leigh; Phillips Petroleum Company/Oklahoma; Chem. Eng. Commun. vol. 24, pp. 139–146.

"Prediction of Rheological Behavior of Branched Polythylene from Molecular Structure", B.H. Bersted, J.D. Slee and C.A. Richter, Journal of Applied Polymer Science, vol. 26, pp. 1001–1014 (1981), John Wiley and Sons, Inc.

"The melt viscosity of Branched Polydisperse Polymers"; European Patent Journal, 1972, vol. 8, p. 19, Pergamon Press,.

*Primary Examiner*—Fred Teskin
*Attorney, Agent, or Firm*—Tai SamChoo

[57] ABSTRACT

Monovinyl aromatic polymer compositions with high melt strength, good flow and good heat properties which are suitable for fast injection molding, blow molding and thermoforming applications, comprising non-linear monovinyl aromatic polymers and copolymers having comb-type structures with 3 branches, star type structures with 4 to 6 branches, and/or dendritic structures in which the branches themselves have attached branched units. These compositions possess inherent melt strength and can be blow molded or thermoformed without sagging or molded into articles in shorter cycle times using less material than linear monovinyl aromatic polymers and copolymers with the same flow and heat distortion temperatures. Also disclosed is a process for making high molecular weight branched monovinyl aromatic polymers, for example, Mw between 75,000 and 500,000, at high rates, comprising polymerizing pure styrene monomer or styrene monomer and polymerizable comonomer via a continuous free radial polymerization process using a peroxide initiator, for example, n-butyl tert-butyl peroxy fumarate, selected from a new class of vinyl peroxide initiators that contain both a copolymerizable double bond and an organic peroxide moiety.

12 Claims, No Drawings

NON-LINEAR STYRENIC POLYMER COMPOSITIONS AND ARTICLES PREPARED THEREFROM

The present invention relates to monovinyl aromatic polymer compositions. More particularly, this invention relates to non-linear monovinyl aromatic polymers, to non-linear monovinyl aromatic polymer compositions and to articles prepared from such nonlinear monovinyl aromatic polymer compositions.

Monovinyl aromatic-based resins, such as, for example, styrene-based resins, are well-known and widely employed for producing a large variety of articles, such as food packaging, toys, small appliances, compact disc and audio/video cassette casings. In these processes, styrene-based resins having lower melt flow rate (such as from 0.5 g/10 minutes to 5 g/10 minutes) are usually preferred. The physical properties of such monovinyl aromatic polymers, also known as styrenic polymers, generally improve as THE molecular weight increases. The processability of such monovinyl aromatic polymers, however, generally decreases as the molecular weight increases. Accordingly, the choice of a monovinyl aromatic polymer having satisfactory properties usually involves a compromise between physical property requirements and processing requirements.

One approach to improve the processability of monovinyl aromatic polymers has been the addition of processing aids, such as plasticizers. It is known that the addition of plasticizers to polymer resins reduces the viscosity and increases the processability while decreasing the physical strength thereof. A problem frequently encountered with the use of such plasticizers is that they also impair certain properties of such polymers.

It also is common practice to improve the physical properties of monovinyl aromatic polymers by modifying the monovinyl aromatic polymer matrix with toughening agents such as rubbers. However, the addition of toughening agents is known to affect the processability of monovinyl aromatic polymers adversely. In addition to the adverse effects of rubber, general purpose polystyrene also loses its transparency and part of its rigidity when rubber is added.

One problem encountered is that most approaches to improve the processability affect adversely the melt strength of the polymer. One attempt to improve melt strength has been the use of specific copolymerizable monomers in the polymerization process. Suitable copolymerizable monomers include polyfunctional monomers such as di-, tri- or tetrafunctional monomers, such as, for example divinyl benzene, di(meth)acrylates, tri(meth)acrylates, and allylic compounds copolymerizable with the monovinyl aromatic monomer(s). One disadvantage of di- or higher functional monomers is that the use of such monomers generally leads to excessive crosslinking and, subsequently, difficulties in processing due to gelling and the higher viscosities encountered in the polymerization process.

Japanese Patent Application 61-87713 describes a process for producing randomly branched styrenic polymers having molecular weights above 540,000 and improved physical properties, such as mechanical strength, as well as good processability. The styrenic polymers described contain a substantial level of residual toluene (approximately 6 percent). It is believed that this styrenic polymer has high melt flow rate due to the presence of volatile components. Likewise, adverse effects on the Vicat heat distortion temperature and melt strength properties of this polymer would be expected. The process comprises the use of one or more organic peroxides, such as alkylperoxyalkyl fumarates and a volatile component removal step at room temperature.

Styrenic polymers are known to be useful in a large variety of applications. For example, refrigerator liners are commonly manufactured industrially using extruded sheets of rubber-modified polystyrene. The sheets are thermoformed into the desired shape and size by first heating them to bring the polymer above its glass transition temperature. The softened polymer is then pressed into a predetermined shape of a door or inner liner. The final, pressed, liner must have a certain thickness to maintain its structural integrity. The blank sheet of polymer is thicker than this minimum thickness in view of the fact that the pressing operation stretches the blank sheet and reduces its thickness, especially in formed corners. The degree of stretching is expressed as the "draw down ratio." In areas such as corners, a minimum wall thickness of one millimetre is commonly needed. In these areas, where high levels of draw down ratio and high levels of built in stress are encountered, any uneven wall thickness distribution is highly undesirable.

Normally, however, an inner liner will have a wall thickness distribution ranging from the one millimetre minimum up to the starting thickness of the blank sheet. Since the material is able to perform well at the minimum thickness, the excess polymer present in the thicker sections has no functional value. If it were possible to reduce the sheet thickness prior to thermoforming and still obtain a thermoformed item meeting the minimum thickness requirements, then several substantial benefits would be obtained. For example, a thinner blank sheet could be used to safely make the same liner resulting in the use of less material and, therefore, a lower manufacturing cost. Additionally, thinner blank sheets would require less heating time, reducing the manufacturing cycle time and improving the consistency of the formed product via having a more even temperature distribution in thinner blank sheets, thus further reducing manufacturing cost.

Another application for styrenic polymers is in film making processes well-known in the art. These processes typically involve feeding of resin granules into an extruder where the resin is heated to a molten state and then extruded through a die and pulled at the same time to introduce orientation. The control of the film thickness, temperature of the film and draw ratios are important parameters that define the film properties. Generally, materials having high melt strength and retaining their orientation are considered better film forming materials than those having lower melt strength and not retaining their orientation.

Yet another application for styrenic polymers is in foam sheet processes well-known in the art where styrenic polymers are extruded with a blowing agent into thin foamed sheets which are either used without any further processing or then thermoformed. The thermoformed foamed sheets are particularly useful, for example, in food packaging, and fabrication of disposable cups. When using atmospheric gas blowing agents to make such sheets, reduced extrusion output rates and/or sheet corrugation may occur, particularly as the sheet density is decreased and the sheet gauge is increased. Increasing the melt strength of these polymers is therefore desired.

In the field of food packaging, such as dairy containers, usually a thermoforming operation is employed. In this operation, a sheet of polymer without any significant loss on processability is heated to a temperature above its glass transition temperature and then, by means of either an assisted plug or pressure of air, formed into the desired article. As in the case of manufacturing refrigerator liners, it is highly desirable to have a material with a higher melt strength since such materials lead to better draw down ratios and a more uniform wall thickness.

Therefore, it would be highly desirable to provide styrenic polymers exhibiting good physical properties and improved melt strength properties without sacrificing the processability and/or heat properties thereof thereby rendering such polymers suitable for producing films, molded articles and thermoformed articles extruded foam articles.

We have now found that it is possible by the use of appropriate branching initiators, for example initiators of the kind disclosed in Japanese Patent Application 61-87713 referred to above, and specific polymerization conditions (specifically, a specific temperature regime), to produce novel non-linear monovinyl aromatic polymers which have desirable properties not possessed by the polymers prepared in the said Japanese application.

In one aspect, the present invention provides a non-linear monovinyl aromatic polymer containing at least 50 weight percent of units derived from at least one monovinyl aromatic monomer, wherein in that the polymer has a weight average molecular weight of from 75,000 to 500,000, a melt strength of from 0.5 g at 190° C. to 10.0 g at 230° C., and contains monomer units having at least 1 and up to 4 branching points. It is particularly preferred that the weight average molecular weight of branches emanating from the said branching points is at least 1,000, preferably at least 5,000.

The polymer optionally contains one or more additional comonomers and/or toughening agents such as rubbers.

In another aspect, the present invention is a foam sheet extruded from a monovinyl aromatic polymer formulation comprising the non-linear monovinyl aromatic polymer composition of this invention.

In another aspect, the present invention is a polymer film prepared from a monovinyl aromatic polymer formulation comprising the non-linear monovinyl aromatic polymer composition of this invention.

In yet another aspect, the present invention provides a process for preparing a non-linear monovinyl aromatic polymer having a weight average molecular weight of from 75,000 to 500,000 characterized by comprising the steps of (a) providing a reaction mixture having at least 50 weight percent of a monovinyl aromatic monomer and, optionally, one or more additional comonomers and/or toughening agents;

(b) heating the reaction mixture to at least 90° C. and maintaining the reaction mixture at at least 90° C. for at least one hour;

(c) raising the heating temperature to at least 140° C. and maintaining the reaction mixture at at least 140° C. for at least four hours; and (d) devolatizing the reaction mixture so as to achieve a residual monomer or diluent/solvent content of not more than 1 percent, based on the reaction mixture.

In yet another aspect, the present invention is an injection molded article prepared from a monovinyl aromatic polymer formulation comprising the non-linear monovinyl aromatic polymer composition of this invention.

In yet another aspect, the present invention is a process for producing a thermoformed article prepared from a monovinyl aromatic polymer formulation comprising the non-linear monovinyl aromatic polymer composition of this invention.

In yet another aspect, the present invention is a polymeric foam prepared from a monovinyl aromatic polymer formulation comprising the non-linear monovinyl aromatic polymer composition of this invention.

Surprisingly, it has been found that the non-linear monovinyl aromatic polymer compositions of the present invention have an improved balance of processability and physical properties and can be prepared without using special equipment. Hence, the non-linear monovinyl aromatic polymer compositions of the present invention are suitable in a wide range of applications.

The non-linear polymers of the present invention comprise a polymer matrix of at least one monovinyl aromatic monomer and, optionally, one or more additional comonomers. The term "non-linear polymer" as used herein means a polymer containing monomer units having at least 1 and up to 4 branching points. The weight average molecular weight of branches emanating from the said branching points will generally be at least 1,000, preferably 5,000 or higher. The structure of such non-linear polymers can be a comb-type form wherein the said monomer units have 3 branching points, a star-type form wherein the said monomer units have from 2 to 4 branching points, or a dendritic structure wherein the branches themselves have branched units attached to them as long as there are no more than 4 branches per monomeric unit.

The higher temperature of polymerization, at least after the initial polymerization phase, of the polymers of the present invention, as compared with those of the Japanese reference referred to above results in branching chain length somewhat lower than in the said reference (i.e., lower than 300,000) which is believed to result in the improved melt strength of the polymers of the invention.

Representative monovinyl aromatic monomers include styrene; alkyl-substituted styrenes such as α-alkylstyrenes (for example, α-methylstyrene and α-ethylstyrene); ring-substituted styrenes (for example, 2,4-dimethylstyrene; o-ethylstyrene, t-butyl-styrene, vinyltoluene and particularly p-vinyltoluene; ring-substituted halostyrenes such as chlorostyrene and 2,4-dichlorostyrene; styrene substituted with both a halo and alkyl group, such as 2-chloro-4-methylstyrene; vinyl anthracene; and mixtures thereof. In general, the polymer matrix is preferably derived from styrene or a combination of styrene and α-methylstyrene. Styrene is the most preferred monovinyl aromatic monomer.

In general, the non-linear monovinyl aromatic polymer will advantageously comprise from 50 to 100, preferably from 65 to 100, more preferably from 75 to 100, weight percent of the monovinyl aromatic monomer(s), based on the total weight of the monomers.

Other comonomers can optionally be employed in combination with the monovinyl aromatic monomer(s). Representative of such other comonomers are the polyvinyl aromatic monomers; the conjugated dienes, such as butadiene and isoprene; theα,β- ethylenically unsaturated carboxylic acids and esters thereof, such as acrylic acid, methacrylic acid, methylacrylate, methyl methacrylate, ethyl acrylate, n-butyl acrylate and 2-ethylhexyl acrylate; the ethylenically unsaturated amides, such as acrylamide and methacrylamide; vinylidene chloride and vinylidene bromide; vinyl esters such as vinyl acetate;

and maleimides such as N-phenyl maleimide. If employed, these comonomers will generally be employed in amounts less than 40, more generally less than 35, weight percent based on the total weight of the monomers employed in preparing the non-linear monovinyl aromatic polymer.

In one embodiment of the present invention, the non-linear monovinyl aromatic polymers can further be rubber-modified. The rubber component employed in the rubber-modified polymer is a rubber which advantageously exhibits a second order transition temperature which is not higher than 0° C., preferably not higher than −20° C., and more preferably not higher than −40° C., as determined or approximated using conventional techniques, for example, ASTM Test Method D-746-52 T. Advantageously, the rubber component of the composition exhibits a gel content (as calculated per Formula I) between 5 percent and 50 percent and a swelling index (as calculated per Formula II) in the range of 7 to 20.

Representative of such rubbers are alkadiene polymers. Suitable alkadienes are 1,3-conjugated dienes, such as butadiene, isoprene, chloroprene or piperylene. Also included are copolymers of dienes. Most preferred are homopolymers (except for any coupling copolymers) prepared from 1,3-conjugated dienes, with homopolymers of 1,3-butadiene being especially preferred.

As used herein, the particle size is the diameter of the rubber particles as measured in the resultant product, including all occlusions of matrix polymer within rubber particles, which occlusions are generally present in the disperse rubber particles of a rubber-reinforced polymer prepared using mass polymerization techniques. Rubber particle morphologies, sizes and distributions may be determined using conventional techniques such as (for larger particles) using a Coulter Counter (Coulter Counter is a trademark of Coulter Electronic Ltd.) or, particularly for smaller particles, transmission electron microscopy.

The particle size of the rubber particles will typically be within the range of 0.1 micron to 10 microns with mono- or multi-modal particle size distributions.

The rubber is advantageously employed in amounts such that the rubber-reinforced polymer product contains from 1 to 45 percent, preferably from 2 to 35 percent, more preferably from 3 to 30 weight percent rubber or rubber equivalent.

The term "rubber" or "rubber equivalent" as used herein to indicate weight amounts of rubber material is intended to mean, for a rubber homopolymer (such as polybutadiene), simply the amount of rubber, and for a block copolymer, the amount of the copolymer made up from monomer(s) which, when homopolymerized form a rubbery polymer. For example, for calculating the amount of rubber in a composition where a butadiene-styrene block copolymer rubber has been employed, the "rubber" or "rubber equivalent" of the composition is calculated based on only the butadiene component in the block copolymer. Obviously where physical properties or other aspects of the rubber material are measured, the complete rubber material including any comonomers is referred to.

The non-linear character of the polymers of the present invention is introduced by the use of one or more specific initiators in the polymerization process of the present invention. Suitable initiators include copolymerizable organic peroxide initiators. Representative copolymerizable organic peroxide initiators useful in the present invention include acrylic acid derivatives containing a peroxide unit, such as a percarbonate, perester, perketal, or a hydroperoxide. The copolymerizable functionality could be derived from any vinylic species that is capable of copolymerization with the monovinyl aromatic monomer employed.

Representative copolymerizable organic peroxide initiators include alkylperoxy-alkylfumarates, such as, for example, t-butylperoxy-methylfumarate, t-butylperoxy-ethylfumarate, t-butylperoxy-n-propylfumarate, t-butylperoxy-isopropylfumarate, t-butylperoxy-n-butylfumarate, t-butylperoxy-t-butylfumarate, t-butylperoxy-sec-butylfumarate, t-butylperoxy-n-hexylfumarate, t-butylperoxy-n-octylfumarate, t-butylperoxy-2-ethylhexylfumarate, t-butylperoxy-phenylfumarate, t-butylperoxy-m-toluylfumarate, t-butylperoxy-cyclohexylfumarate, t-amylperoxy-n-propylfumarate, t-amylperoxy-isopropylfumarate, t-amylperoxy-n-butylfumarate, t-amylperoxy-t-butylfumarate, t-amylperoxy-n-octylfumarate, t-amylperoxy-2-ethyl hexylfumarate, t-hexylperoxy-ethylfumarate, t-hexylperoxy-n-propylfumarate, t-hexylperoxy-isopropylfumarate, t-hexylperoxy-n-butylfumarate, t-hexylperoxy-t-butylfumarate, t-hexylperoxy-cyclohexylfumarate, t-hexylperoxy-2-ethylhexylfumarate, t-hexyl peroxy-phenylfumarate, cumylperoxy-ethylfumarate, cumylperoxy-isopropylfumarate, cumylperoxy- n-butylfumarate, cumylperoxy-t-butylfumarate, cumylperoxy-2-ethylhexylfumarate, cumylperoxy-m-toluylfumarate, and cumylperoxy-cyclohexylfumarate. Preferred initiators are t-butylperoxy-isopropylfumarate, t-butylperoxy-n-butylfumarate, t-butylperoxy-sec-butylfumarate, t-butylperoxy-t-butylfumarate, t-butylperoxy-ethylfumarate, t-butylperoxy-n-hexylfumarate, t-butylperoxy-phenylfumarate, with t-butylperoxy-n-butylfumarate and t-butylperoxy-t-butylfumarate being especially preferred.

The copolymerizable organic peroxide initiators are typically employed in amounts of from 0.001 to 2.0, preferably from 0.001 to 0.5, most preferably from 0.002 to 0.3, weight percent, based on the total weight of the monomers.

In another embodiment of the present invention, the non-linear monovinyl aromatic polymers can be blended with linear monovinyl aromatic polymers or rubber-modified linear or non-linear monovinyl aromatic polymers. The ratio of non-linear monovinyl aromatic polymer to linear monovinyl aromatic polymers or rubber-modified linear or non-linear monovinyl aromatic polymer is not critical and can be any ratio as long as the desired properties, such as melt strength, are achieved.

The monovinyl aromatic polymer compositions of the present invention, which can be optionally rubber-reinforced, can be prepared by any of the several polymerization methods known to those skilled in the art including, for example anionic, cationic or free radical, which is preferred, polymerization. The monovinyl aromatic polymers can be prepared by well known methods including, for example, mass, emulsion, suspension and mass suspension methods. in general, continuous methods are employed for polymerizing the monovinyl aromatic monomer(s). Mass polymerization is the most preferred polymerization process for use in the present invention. Typically, mass polymerization results in a mixture of non-linear and linear polymers.

In this invention, the proportion of linear to non-linear polymers is not particularly critical as long as the melt strength specifications of the polymer are met. The proportion of linear to non-linear polymers depends on the type, amount and number of additions of initiator to the polymerization mixture as well as on the number and molecular weight of the branches of the non-linear polymer. If the non-linear polymer has a high number of high molecular weight branches (e.g. Mw of up to 50,000), then relatively lower amounts of the non-linear polymer are required to achieve the desired melt strength specification. If, on the other hand, the molecular weight of both the non-linear polymer and its branches are relatively low (e.g., both Mw of less than 50,000), a higher proportion of the non-linear polymer will be required. In the case where the molecular weight of both the non-linear polymer and its branches are relatively high, as low as 5 percent by weight will be sufficient to achieve the desired melt strength.

The non-linear monovinyl aromatic polymer compositions of the present invention advantageously have a weight average molecular weight (Mw) of from 75,000 to 500,000, preferably from 100,000 to 400,000, more preferably from 120,000 to 380,000. The molecular weight distribution (Mw/Mn (number average molecular weight)) of the non-linear monovinyl aromatic polymer composition of the present invention is generally from 1.1 to 5, preferably 1.5 to 4, and more preferably 1.8 to 4. The compositions of the invention advantageously exhibit improved melt strength properties while essentially maintaining other important physical properties such as rigidity, toughness and, in the case of clear matrix polymers, transparency and processability. Typically, the non-linear monovinyl aromatic polymer of the present invention exhibits melt strength properties in the range between 0.5 g at 190° C. to 10.0 g at 230° C., preferably from 1.5 g at 190° C. to 8.0 g at 230° C., and most preferably from 1.6 g at 190° C. to 6.0 g at 230° C.

The non-linear monovinyl aromatic polymer compositions of the present invention advantageously have a Vicat heat distortion temperature of at least 60° C., preferably between 70° C. and 110° C. Surprisingly, it has been found that the non-linear monovinyl aromatic polymer compositions of the present invention, at a given melt flow rate and Vicat heat distortion temperature exhibit a melt strength of at least 20, preferably at least 30, more preferably 50 percent higher than linear monovinyl aromatic polymer compositions of same melt flow rate at a given Vicat heat distortion temperature.

In a preferred embodiment, the preparation of the non-linear styrenic thermoplastic polymer resin compositions in accordance with the present invention is carried out by feeding monovinyl aromatic monomer, advantageously in the presence of suitable amounts of an organic liquid reaction diluent, such as, for example, ethyl benzene, and in the presence of other optional additives, such as mineral oils, chain transfer agents and rubber, into a first, out of three, stirred tube-type reactor having 3 reaction zones. The 3 reactors are assembled in a series and each have 3 reaction zones with independent temperature control. The polymerization mixture is then initially heated up to at least 90° C. for at least one hour to initiate the polymerization and then to at least 140° C. for at least four hours. The copolymerizable organic peroxide initiator is then added to the polymerization mixture at any desired stage of the polymerization process. Typically, the initiator is added in the first reaction zone of any reactor, preferably of the first reactor. Typically, the polymerization is started at 100° C. and within the first reaction zone of the reactor, then the temperature is increased in order to maintain an approximately constant polymerization rate. Usually, the temperature in the third reaction zone of the third reactor reaches 180° C.

The polymerization mixture leaving the reactor is passed through a heater at a temperature in excess of 200° C. and then subjected to vacuum. At this point, unreacted monomers and diluents are evaporated and condensed in a condenser to be recycled to the feed in the first reaction zone. The polymer melt is then extruded and granulated.

By carrying out the polymerization as indicated above, non-linear monovinyl aromatic polymers having a weight average molecular weight of from 75,000 to 500,000, and containing monomer units with at least 1 and up to 4 branches or branching points having a weight average molecular weight of at least 1,000 are obtained.

The number, length, as well as molecular weight of the branches of non-linear polymers are readily determined by well-known kinetics calculations, based on the monomer composition, initiator reactivity, and/or process conditions. Such calculations are well known, for example from Principles of Polymerization, 2nd edition, John Wiley and sons, New York, 1981.

The aforementioned polymer compositions are particularly well suited for the preparation of blow molded articles, films, extruded foam, refrigerator liners, thermoformed articles and injection molded articles.

A food packaging process useful in the present invention is any of the well-known food packaging processes in the art used to prepare yogurt cups, trays of all sizes and shapes for general food packaging and vending cups. The food packaging process typically involves extrusion of a first polymer sheet at a thickness of a few millimetres (typically between 1.5 mm and 0.2 mm). This sheet is then fed to one or more heating ovens where the temperature is increased well above the glass-transition temperature of resin. Once the desired temperature is reached, the sheet is formed into the desired shape by known processes such as plug assisted thermoforming where a plug pushes the sheet into a mold of the desired shape. Air pressure and/or vacuum can also be employed to mold the desired shape.

The preparation of styrenic thermoplastic polymer refrigerator liners in accordance with the present invention typically involves extrusion of a polymer sheet. This sheet is then fed to one or more heating ovens where the temperature is increased well above the glass transition temperature of resin. Once the desired temperature is reached, the sheet is formed into the desired shape by known processes such as plug assisted thermoforming where a plug pushes the sheet into a mold of the desired shape.

The following examples are given to illustrate the invention and should not be interpreted as limiting it in any way. Unless stated otherwise, all parts and percentages are given by weight.

The following test methods were employed to determine the physical properties of both the monovinyl aromatic polymer resin and the foam prepared therefrom.

Melt Flow Rate

The melt flow rate (MFR) is measured using a Zwick MFR Measurement Apparatus, Model 4105, according to the test procedure ASTM D-1238-86 at 200° C. and 5 kilograms (kg) load.

Melt Strength

Melt strength measurements are made using an extrusion plastometer as described in ASTM D-1238-86 at the temperatures given in the examples. A heated cylinder is filled with the polymer sample at a constant temperature with one end of the cylinder restricted with a small die (8 mm long) with an orifice having a diameter of 2.1 mm.

A constant load of 5 kg or a constant speed of the traverse (preferably of 10 mm/minute) is applied to force the polymer through the orifice of the die after a predetermined heating time has elapsed. The extrudate passes vertically downward under a first pulley, then passes vertically upward over a second pulley and then passes horizontally to a wind-up drum. In the present invention, unless otherwise indicated, this wind-up drum is rotated at 100 revolutions per minute (rpm). Each pulley is of black anodized aluminum alloy, has a nominal diameter of 31.75 mm (1.25 inches) measured at the center of a 120° V-groove, and is 2.9 mm (0.114 inches) thick. Both pulleys have a precision instrument bearing and are statically balanced.

The strain on the first pulley is measured via a strain cell having a capacity of 60 grams or less. Typically, the most sensitive range of 0–10 grams is used for accuracy purposes. The strain cell is calibrated using analytical weights. The first pulley is mounted on a force lever which is adjustable to permit increasing the force applied to the strain cell by factors of up to 8 times the applied force. The wind-up drum is aluminum and has a diameter of 50.8 mm (2.0 inches) and is about 76.2 mm (3.0 inches) wide. The drum is equipped with a means for adjusting the speed over a range of from 0 to 2,000 rpm. The force at a given rate of rotation is a measure of the melt strength of the material.

Molecular Weight

The weight average molecular weight, Mw, and number average molecular weight, Mn, for the polymers are determined by the gel permeation chromatographic techniques described by ASTM test method D-3536 (polystyrene standard) and expressed without correction for the differences between polymers and polystyrene standards.

Vicat Heat Distortion Temperature

Vicat heat distortion temperature (Vicat) is measured using injection molded test bars according to test method ASTM D-1 525-87, rate B, load 1 kg.

Izod Impact

The unnotched Izod Impact tests were carried out according to ASTM D-256/A-1988 using a Zwick Impact Tester, Model 5102 using a 2Joule (J) pendulum hammer and test bars with dimensions of 63 mm by 12.7 mm by 3.2 mm.

Tensile Yield Strength

The tensile yield strength (Ty) was measured according to ASTM D-638M.

Gel Content

The gel content is measured by dissolving 1 gram of polymer in 50 millilitre (mL) toluene for 2 hours in a shaker. The solution is then centrifuged at 16,000 rpm for 1 hour. The supernatant liquid is carefully removed and the wet gel weighed. Then, the wet gel is dried under vacuum at 150° C. for 1 hour and its dry weight determined. The following Formula I is used to determine gel content:

$$\text{Gel Content } (\%) = \frac{\text{Dry Weight}(g)}{\text{Initial Weight}(g)} \times 100 \qquad (I)$$

Swelling Index

The swelling index is determined by the following Formula II:

$$\text{Swelling Index} = \frac{\text{Wet Weight } (g)}{\text{Dry Weight } (g)} \qquad (II)$$

EXAMPLE 1–14

Unmodified Resin Preparation

A series of unmodified non-linear monovinyl aromatic polymers was prepared using three-plug flow reactors of 2.5 litre (L) capacity and in a series configuration. An amount and type of a free radical, branching initiator as specified in Table I was added to the first reaction zone of the first reactor. Simultaneously with the initiator feed, the polymerization feed was added to the first reaction zone of the first reactor at a feeding rate of 1170 grams/hour (g/h). The polymerization reaction was carried out by continuously stirring the polymerization mixture and continuously increasing the temperature of the polymerization mixture from 105° C. in the first zone of the first reactor to 170° C. in the last zone of the third reactor.

Upon completion of the polymerization reaction, the polymerization mixture was fed to a devolatilizing extruder to remove the unreacted styrene monomer and ethyl benzene diluent under vacuum. The devolatilization was carried out at 220° C. and under 15 mbar vacuum. The conversion was calculated based on the following Formula III:

$$\text{Conversion } (\%) = \frac{\text{Weight of polymer in 1 hour}(g)}{\text{Total feeding rate in 1 hour}(g)} \times 100 \qquad (III)$$

Based on Formula III, a total conversion of 80 percent (%) was achieved. The extruded polymer was then stranded and cut into pellets with a rotating knife.

The resins were evaluated for their properties which are set forth in Table I together with the monomeric compositions thereof.

COMPARATIVE EXAMPLES A–G

Unmodified Resin Preparation

A series of unmodified linear monovinyl aromatic polymer was prepared by following the procedure of Example 1, except using a standard non-branching initiator (1, 1-di-tert-butoxycyclohexane) as the free radical initiator. The properties thereof as well as the monomeric compositions are set forth in Table I.

As readily apparent from the data shown in Table I, the non-linear monovinyl aromatic polymers of the present invention exhibit significantly higher melt strength than the monovinyl aromatic polymers of the state of the art (comparative examples). Specifically, comparing Example 3 with Comparative Example A, although both have approximately the same melt flow rate and Vicat heat distortion temperature, the melt strength of Example 3 is over 80 percent higher than that of Comparative Example A. Similarly, upon comparing Example 8 with Comparative Example C, an increase of over 45 percent in the melt strength of Example 8 of the present invention was observed.

Samples of the monovinyl aromatic polymers prepared in Example 3 and Comparative Example A were extruded into thin foam sheets and evaluated for their properties. The sheet appearance was visually evaluated with 1 being very poor appearance (completely corrugated surface) and 10 being excellent appearance (no corrugation). The results are given in Table II.

The data in Table II shows that, in the example of the present invention (Example 3), the output rate of the non-linear monovinyl aromatic polymer has significantly improved producing a foam sheet having better appearance than a foam sheet prepared with linear polystyrene polymer (Comparative Example A) at comparable densities.

EXAMPLES 15–19

Modified Resin Preparation

A series of high impact, non-linear, rubber-modified monovinyl aromatic polymers was prepared by the following generic procedure of Example 1, except for using rubber dissolved in the polymerization feed. The rubber was a diene-based rubber Diene 55, commercially available from Firestone Company. The polymerization feed was added at a feeding rate of 1500 g/h. The polymerization reaction was carried out by continuously stirring the polymerization mixture and continuously increasing the temperature of the polymerization mixture from 115° C. in the first part of the reactor to 165° C. in the last part of the reactor.

The rubber particle size is controlled by the agitation speed in the first part of the reactor. At high speeds a small particle size is obtained whereas at low speeds a large particle size is obtained. Upon completion of the polymerization reaction, the polymerization mixture was fed to a devolatilizing extruder as described in Example 1 to remove unreacted starting material under vacuum. The conversion was calculated based on Formula I as being 80 percent.

The non-linear, rubber-modified monovinyl aromatic polymers were evaluated for their properties and the monomeric compositions are set forth in Table III and the properties thereof are set forth in Table IV.

COMPARATIVE EXAMPLES H–J

Modified Resin Preparation

A series of high impact, linear, rubber-modified monovinyl aromatic polymers was prepared by following the procedure of Example 15, except for using 1,1-di-tert-butoxycyclohexane as the free radical initiator. The monomeric compositions are set forth in Table III and the properties thereof are set forth in Table IV.

As readily apparent from the data shown in Tables III and IV, the non-linear, rubber-modified monovinyl aromatic polymers of the present invention also possess higher melt strength than the comparative example polymers. Specifically, comparing Example 15 with Comparative Example H, although both have approximately the same melt flow rate and Vicat heat distortion temperature, the melt strength of Example 15 is 60 percent higher than that of Comparative Example H. A comparison of Example 16 and Comparative Example J shows that while both examples have approximately the same Vicat heat distortion temperature, Example 16 has both higher melt flow rate and melt strength.

The monovinyl aromatic polymers of Example 18 and Comparative Example H were blended with the monovinyl aromatic polymer of Comparative Example G. The blend ratios as well as the physical properties of these blends in comparison to the polymers properties alone are given in Table V.

As readily apparent from the data shown in Table V, upon comparing the blends containing linear polystyrene and the non-linear polystyrene of the present invention (18G (75/25) and 18/G (50/50)), it is readily apparent that their physical properties are significantly improved over those blends containing linear polystyrene and linear rubber-modified polystyrene (H/G (75/25) and H/G (50/50)).

According to well-known procedures, monovinyl aromatic polymers of Example 17 and Comparative Examples I and J were extruded into sheets of a standard thickness (2.2 mm), then heated for a specified time, as given in Table VI, and then thermoformed into refrigerator liners of the mini-fridge-type (60 cm×30 cm×30 cm) having a freezer compartment. The resultant liners (Liner 17, and Comparative Liners I and J) were evaluated for their thickness distribution. The measurement of the thickness distribution was carried out following two procedures. First, the so-called 14-point Measurement Test which involves measuring along the centerline of the sidewall at 14 different points the thickness of the liner. Second, the so-called critical Grid Method where 32 thickness measurements are taken in an 8×4 grid located at the fridge/freezer dividing part (fridge/freezer insert compartment) between the fridge and freezer compartments. The fridge/freezer insert compartment is typically the thinnest part of the fridge and, therefore, considered the most critical region on the inner liner. The thermoforming conditions as well as the thickness measurement results are given in Table VI.

As apparent from the data shown in Table VI, the liner of the present invention (Liner 17) exhibits about 25 percent less standard deviation in the thickness distribution compared to Comparative Liner I, at the same heating time.

The monovinyl aromatic polymers of Example 17 and Comparative Example J were blow molded into refrigerator doors having a weight of 2.2 kg. The thickness distribution of these parts (Door 17 and J) were measured in 35 points using an ultrasonic thickness gauge with a measuring error of 0.05 mm. The results are given in Table VII.

Again, the data clearly shows that, at the same overall weight, Door 17 is 26 percent thicker in critical corners designated along the centerline of the door, compared to Door J, prepared from a linear, rubber-modified polystyrene polymer.

COMPARATIVE EXAMPLES K–N

Initiator Comparison For Unmodified Polymer Preparation

Unmodified linear monovinyl aromatic polymers were prepared by following the procedure of Example 1, except for using a standard non-branching tert-butoxy maleic acid (Comparative Example K and L) and 1,1-di-tert-butoxy cyclohexane (Comparative Example M and N) as the free radical initiator. The monomeric compositions thereof as well as the melt strength properties are set forth in Table VIII in comparison to Examples 6 and 7 of the present invention.

As apparent from the data shown in Table VIII, at comparable molecular weights, the fumarate-initiated polymers exhibit higher melt strengths. In fact, the maleate-initiated polymers (Comparative Example K and L) are clearly comparable to standard materials, such as Comparative Example M and N.

COMPARATIVE EXAMPLES O and P

Two polymers were prepared following the teachings of Example 3 of the Japanese Patent Application 61-87713. The same ingredients and amounts as taught therein were used, except that the polymerization was carried out at 110° C. for 6 hours. The polymers were recovered from the solution and dried in different manners. One polymer was dried as taught in the above-mentioned Japanese Patent Application, that is, at room temperature and under vacuum (Comp. Ex. O) and the other polymer (Comparative Example P) was first dried for 1 hour under vacuum at 120° C. and then for 4 more hours at 140° C., also under vacuum. The molecular weight and composition properties of these polymers are set forth in Table IX.

The data shown in Table IX clearly shows that the improved melt flow rate of Comparative Example O is due to the presence of toluene. Toluene is known to function as a plasticizer and it is believed that in Comp. Ex. O that is the function performed by the toluene. Although not measured, it is known that the presence of plasticizers reduce the Vicat heat distortion temperature of the polymer. Thus, at the high levels of about 6 percent of residual toluene the heat distortion temperature would be unacceptably low for use in the present invention, in addition to being unacceptable for industrial extrusion and injection molding processes that are typically used for preparing the articles of the present invention.

TABLE I

Properties of Unmodified Branched Polystyrene

| Ex./Comp. Ex. | Monomeric Composition | | | | | Properties | | | | | |
|---|---|---|---|---|---|---|---|---|---|---|---|
| | ST[1] | EB[2] | BA[3] | Init[4] | NDM[5] | Mw[7] | Mn[7] | MFR | Izod, J/m | Vicat (°C.) | Melt Strength (@ °C.) |
| 1 | 97.5 | 2.5 | 0 | 850 | 0 | 340 | 118 | 2.2 | ND[6] | 108 | 8.9 (200) |
| 2 | 96 | 4 | 0 | 840 | 0 | 313 | 116 | 2.8 | ND[6] | 108 | 7.9 (200) |
| 3 | 92 | 8 | 0 | 840 | 0 | 352 | 115 | 1.7 | 157 | 108 | 9.5 (200) |
| 4 | 90 | 10 | 0 | 840 | 99 | 296 | 112 | 3.5 | ND[6] | 108 | 6.7 (200) |
| 5 | 90 | 10 | 0 | 840 | 0 | 294 | 111 | 3.5 | ND[6] | 108 | 6.4 (200) |
| 6 | 90 | 10 | 0 | 840 | 99 | 281 | 109 | 3.7 | ND[6] | 108 | 6.3 (200) |
| 7 | 90 | 10 | 0 | 850 | 160 | 274 | 105 | 3.8 | ND[6] | 108 | 6.0 (200) |
| 8 | 85 | 15 | 0 | 840 | 700 | 145 | 64 | 21 | 86 | 108 | 3.25 (190) |
| 9 | 82 | 15 | 3 | 840 | 600 | 160 | 69 | 25.2 | ND[6] | 101 | 2.25 (190) |
| 10 | 88 | 12 | 0 | 840 | 400 | 200 | 85 | 8.4 | ND[6] | 108 | 5.9 (190) |
| 11 | 97.5 | 2.5 | 0 | 850 | 0 | 438 | 127 | 1 | 224 | 108 | ND[6] |
| 12 | 96 | 4 | 0 | 840 | 0 | 364 | 122 | 1.8 | 187 | 108 | ND[6] |
| 13 | 90 | 10 | 0 | 860 | 165 | 277 | 107 | 3.7 | 135 | 108 | ND[6] |
| 14 | 90 | 10 | 0 | 970 | 0 | 200 | 92 | 8.2 | 110 | 108 | ND[6] |
| A* | 98 | 2 | 0 | 250 | 0 | 290 | 125 | 1.6 | 118 | 108 | 5.2 (200) |
| B* | 92 | 8 | 0 | 250 | 0 | 220 | 90 | 5.4 | 88 | 108 | 5.2 (190) |
| C* | 90 | 10 | 0 | 0 | 700 | 132 | 60 | 23 | 68 | 108 | 2.2 (190) |
| D* | 90 | 10 | 0 | 0 | 400 | 152 | 52 | 24 | ND[6] | 108 | 2.5 (190) |
| E* | 90 | 10 | 0 | 0 | 100 | 190 | 75 | 9.1 | ND[6] | 106 | 4.2 (190) |
| F* | 96 | 4 | 0 | 250 | 0 | 270 | 116 | 2.4 | 95 | 108 | ND[6] |
| G* | 98 | 2 | 0 | 250 | 0 | 310 | 135 | 2.5 | ND[6] | 97 | ND[6] |

*Not an example of the present invention.
**Contains 3.2 weight percent mineral oil.
[1]ST = styrene in weight percent.
[2]EB = ethyl benzene in weight percent.
[3]BA = n-butyl acrylate.
[4]Init = Initiator in ppm. N-butylperoxy fumarate as branching initiator for Ex. 1–10; and 1,1-di-tert-butoxycyclohexane as standard non-branching initiator for Comp. Ex. A, B, F and G.
[5]NDM = n-dodecyl mercaptan chain transfer agent in ppm.
[6]ND = not determined.
[7]multiply indicated number by 1,000.

TABLE II

Foam Sheet Properties

| Property | Ex 3 | Comp. Ex. A* |
|---|---|---|
| Output Rate, kg/m³ | 17.0 | 15.1 |
| (lb/h) | (37.5) | (33.3) |
| Density, kg/m³ | 87 | 80 |
| (lb/ft³) | (5.4) | (5.0) |
| $CO_2$, wt %[1] | 2.24 | 2.43 |
| Post Expansion, % | 29 | 28 |
| Sheet Appearance | Better (8) | Average (5) |
| Cell Size, mm (MD[2]) | 0.33 | 0.33 |
| Cell Size, mm (CD[3]) | 0.41 | 0.41 |
| Cell Size, mm (VD[4]) | 0.20 | 0.20 |

*Not an example of the present invention.
[1]amount of $CO_2$ in weight percent.
[2]MD = machine direction.
[3]CD = cross-sectional direction.
[4]VD = vertical direction.

TABLE III

Composition of Rubber-Modified Branched Polystyrene

| Ex./Comp. Ex. | Monomeric Composition | | | | | |
|---|---|---|---|---|---|---|
| | ST[1] | EB[2] | Rubber[3] | Min. Oil[4] | Init[5] | NDM[6] |
| 15 | 84.2 | 7 | 6.8 | 2 | 750 | 0 |
| 16 | 86.2 | 7 | 6.8 | 0 | 750 | 0 |
| 17 | 85.2 | 7 | 6.8 | 1 | 750 | 0 |
| 18 | 83.7 | 7 | 6.8 | 2.5 | 880 | 99 |
| 19 | 84.2 | 7 | 6.8 | 2 | 750 | 0 |
| H* | 84.2 | 7 | 6.8 | 2 | 0 | 0 |
| I* | 83.9 | 7 | 6.8 | 2.3 | 250 | 120 |
| J* | 88.2 | 5 | 6.8 | 0 | 250 | 120 |

*Not an example of the present invention.
[1]ST = styrene in weight percent.
[2]EB = ethyl benzene in weight percent.
[3]Rubber = butadiene in weight percent.
[4]Mineral Oil in weight percent.
[5]Init = branching initiator in ppm. N-butyl tert-butylperoxy fumarate for Ex. 15–19; and 1,1-di-tert-butoxycyclohexane for Comp. Ex. I and J.
[6]NDM = n-dodecyl mercaptan chain transfer agent in ppm.

TABLE IV

Properties of Rubber-Modified Branched Polystyrene

| Ex./ Comp. Ex. | Mw[7] | Mn[7] | MFR | Izod, J/m | Vicat (° C.) | Ty[1], MPa | Gel, % | Sw Ind[2] | EP % RB[3] | RPS[4] | EP % MO[5] | Melt Strength (@ 190° C.) |
|---|---|---|---|---|---|---|---|---|---|---|---|---|
| 15 | 210 | 74 | 3.0 | 130 | 102.5 | 17 | 37 | 11 | 8.5 | 3 | 2.2 | 3.3 |
| 16 | 198 | 70 | 2.0 | 92 | 107.5 | 24 | 42 | 9 | 8.5 | 6 | 0 | 3.3 |
| 17 | 198 | 70 | 2.5 | 118 | 104 | 17 | 42 | 9 | 8.5 | 6 | 1.3 | 3.1 |
| 18 | 237 | 87 | 3.2 | 139 | 99.3 | 19 | 37 | 11 | 8.5 | 3.2 | 2.8 | ND[6] |
| 19 | 185 | 76 | 3.6 | 143 | 102 | 17 | 39 | 12 | 8.5 | 3 | 2.5 | ND[6] |
| H* | 192 | 84 | 3.3 | 117 | 100.5 | 16 | 39 | 12 | 8.5 | 3 | 2.3 | 2.0 |
| I* | 184 | 81 | 3.2 | 101 | 101 | 12 | 42 | 9 | 8.5 | 6 | 2.8 | 2.0 |
| J* | 205 | 95 | 1.2 | 95 | 106 | 17 | 42 | 9 | 8.5 | 6 | 0 | 2.4 |

*Not an example of the present invention.
[1]Ty = tensile yield strength.
[2]Sw Ind = Swelling Index.
[3]EP % RB = percentage of rubber in the end product.
[4]RPS = rubber particle size in microns.
[5]EP % MO = percentage of mineral oil in the end product.
[6]ND = not determined.
[7]Multiply number by 1,000.

TABLE V

Physical Properties of Branched Polystyrene Blends

| Blend Ex. | Blend Ratio | Izod J/m | Ty[1,] MPa | Elong.[2,] % | E-Mod.[3,] MPa |
|---|---|---|---|---|---|
| 18 | — | 139 | 18.9 | 52.6 | 1780 |
| 18/G* | 75/25 | 125 | 21.3 | 62.6 | 2062 |
| 18/G* | 50/50 | 96 | 24.3 | 55.2 | 2429 |
| H* | — | 112 | 15.5 | 52.0 | 1539 |
| H*/G* | 75/25 | 104 | 19.9 | 42.0 | 1782 |
| H*/G* | 50/50 | 78 | 22.6 | 41.8 | 2194 |
| G* | — | 19 | 40.1 | 1.3 | 3173 |

*Not an example of the present invention.
[1]Ty = tensile yield strength.
[2]Elong = elongation (%) measured according to ASTM D-638M.
[3]E-Mod = E-Modulus measured according to ASTM D-638M.

TABLE VI

Thermoforming Conditions

| Liner/Comp. Liner | Heating Time, Sec | 14-Point TF[1], mm | Critical Grid Tf[1], mm | Critical Grid Mean Thickness[2] mm |
|---|---|---|---|---|
| 17 | 60 | 0.304 | 0.56 | 0.887 |
| 17 | 62 | 0.252 | 0.485 | 0.987 |
| I* | 60 | 0.40 | 0.592 | 0.841 |
| I* | 62 | 0.31 | 0.511 | 0.985 |
| J* | 62 | 0.427 | 0.609 | 0.764 |
| J* | 65 | 0.385 | 0.62 | 0.871 |
| Desired | low | low | low | high |

*Not an example of the present invention.
[1]Tf = standard deviation in thickness measured over 3 samples.
[2]Average of the 32 measurements (8 × 4 grid) in the critical grid procedure.

TABLE VII

Blow Molding of a refrigerator door

| Position No. | Thickness, mm Door 17 | Thickness, mm Door J* |
|---|---|---|
| 9 | 0.60 | 0.53 |
| 11 | 0.60 | 0.53 |
| 13 | 0.65 | 0.53 |
| 15 | 0.66 | 0.52 |
| 17 | 0.66 | 0.54 |
| 19 | 0.75 | 0.57 |
| 21 | 0.77 | 0.56 |
| 23 | 0.72 | 0.55 |
| Average Thickness, mm | 0.68 | 0.54 |
| Rel. Impr.[1], % | 26 | 0 |

*Not an example of the present invention.
[1]Rel Impr. = Relative improvement between Example 17 and Comparative Example J.

TABLE VIII

Monomeric Composition

| Ex. or Comp. Ex | ST[1] | EB[2] | Init[3] | Init amount, ppm | Mw[7] | Mn[7] | Melt Strength @ 200° C. |
|---|---|---|---|---|---|---|---|
| K* | 90 | 10 | MAL[4] | 400 | 286 | 122 | 5.2 |
| L* | 90 | 10 | MAL[4] | 400 | 269 | 108 | 4.8 |
| 6 | 90 | 10 | FUM[5] | 850 | 281 | 109 | 6.3 |
| 7 | 90 | 10 | FUM[5] | 850 | 274 | 105 | 6.0 |
| M* | 95 | 5 | CHEX[6] | 300 | 285 | 120 | 5.0 |
| N* | 95 | 5 | CHEX[6] | 300 | 265 | 101 | 4.5 |

*Not an example of the present invention.
[1]ST = styrene in weight percent.
[2]EB = ethyl benzene in weight percent.
[3]Init = type of initiator employed.
[4]MAL = tert-butyl peroxy maleic acid.
[5]FUM = t-butylperoxy-n-butyl-fumarate.
[6]CHEX = 1,1-di-tert-butoxycyclohexane.
[7]multiply the number by 1,000.

TABLE IX

| Property/Condition | Comp. Ex. 0* | Comp. Ex. P* |
|---|---|---|
| Initiator, % | 0.2 | 0.2 |
| Mw (x 1000) | 841 | 712 |
| Mn (x 1000) | 176 | 161 |
| MFR[1], g/10 min | 0.7 | 0.2 |
| Residual Toluene, % | 5.8 | 0.24 |

*Not an example of the present invention.
[1]MFR = melt flow rate.

What is claimed is:

1. A non-linear monovinyl aromatic polymer containing at least 50 weight percent of units derived from at least one monovinyl aromatic monomer having a weight average molecular weight of from 75,000 to 500,000, a melt strength of from 0.5 g at 190° C. to 10.0 g at 230° C., and the polymer contains monomer units having at least 1 and up to 4 branching points, characterized in that the non-linear monovinyl aromatic polymer has a comb-type form wherein the said monomer units have 3 branching points, a star-type form wherein the said monomer units have from 2 to 4 branching points, or a dendritic structure wherein the branches their selves have branched units attached to them as long as there are no more than 4 branches per monomeric unit.

2. A non-linear monovinyl aromatic polymer as described in claim 1 which contains one or more additional comonomers and/or toughening agents.

3. A non-linear monovinyl aromatic polymer as described in claim 2 wherein the toughening agent is rubber.

4. A polymer composition comprising (A) a non-linear monovinyl aromatic polymer as described in claim 1 and (B) a linear monovinyl aromatic polymer.

5. A polymer composition as described in claim 4 wherein the linear monovinyl aromatic polymer further comprises one or more additional comonomers and/or toughening agents.

6. A polymer film prepared from a non-linear monovinyl aromatic polymer as described in claim 1.

7. A polymeric foam prepared from a non-linear monovinyl aromatic polymer as described in claim 1.

8. A foam sheet prepared from a non-linear monovinyl aromatic polymer as described in claim 1.

9. A molded article prepared from a non-linear monovinyl aromatic polymer as described in claim 1.

10. A thermoformed article prepared from a non-linear monovinyl aromatic polymer as described in claim 1.

11. A process for preparing a non-linear monovinyl aromatic polymer having a weight average molecular weight of from 75,000 to 500,000 characterized by comprising the steps of (a) providing a reaction mixture having at least 50 weight percent of a monovinyl aromatic monomer and one or more copolymerizable organic peroxide initiators and, optionally, one or more additional comonomers and/or toughening agents;

(b) heating the reaction mixture to at least 90° C. and maintaining the reaction mixture at at least 90° C. for at least one hour;

(c) raising the heating temperature to at least 140° C. and maintaining the reaction mixture at at least 140° C. for at least four hours; and (d) devolatizing the reaction mixture so as to achieve a residual monomer or diluent/solvent content of not more than 1 percent, based on reaction mixture.

12. A process as described in claim 11 wherein the copolymerizable organic peroxide initiators are alkylperoxy-alkylfumarates.

* * * * *